(12) United States Patent
Sandusky et al.

(10) Patent No.: US 8,083,194 B2
(45) Date of Patent: Dec. 27, 2011

(54) LATCHING MECHANISM AND REPOSITIONABLE PART SUPPORT DEVICE EMPLOYING SAID LATCHING MECHANISM

(75) Inventors: John Sandusky, Columbus, IN (US); Ken Bollack, North Lewisburg, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/099,272

(22) Filed: May 2, 2011

(65) Prior Publication Data
US 2011/0206450 A1    Aug. 25, 2011

Related U.S. Application Data (62) Division of application No. 11/859,693, filed on Sep. 21, 2007, now abandoned.

(51) Int. Cl.
*A47G 29/02* (2006.01)
*A47G 29/00* (2006.01)
*F16L 3/08* (2006.01)
*B60P 1/48* (2006.01)

(52) U.S. Cl. .............. 248/241; 248/220.21; 248/222.11; 248/226.11; 254/10 B; 254/10 R (58) Field of Classification Search ............. 248/220.21, 248/220.22, 222.11, 226.11, 274.1, 285.1, 248/241; 269/17; 254/10 B, 10 R, 2 B
See application file for complete search history.

(56) References Cited

U.S. PATENT DOCUMENTS

| | | | |
|---|---|---|---|
| 2,194,648 A | * | 3/1940 | Ferrini ................... 248/226.11 |
| 2,760,647 A | | 8/1956 | Saul, Jr. |
| 3,805,966 A | | 4/1974 | Wakeman et al. |
| 4,030,611 A | | 6/1977 | Konstant |
| 4,073,396 A | | 2/1978 | Derain |
| 5,190,172 A | | 3/1993 | Tyson |
| 5,199,680 A | | 4/1993 | Rivera |
| 5,257,794 A | | 11/1993 | Nakamura |
| 5,344,266 A | | 9/1994 | Kolb |
| 5,479,852 A | * | 1/1996 | Lloyd ........................ 108/146 |
| 5,890,855 A | | 4/1999 | Claps |
| 5,941,666 A | | 8/1999 | Waters |
| 6,123,314 A | * | 9/2000 | Steele ........................ 248/681 |
| 6,234,432 B1 | | 5/2001 | Piller et al. |
| 6,244,552 B1 | * | 6/2001 | Adams et al. ............. 248/274.1 |
| 6,422,957 B1 | * | 7/2002 | Winter et al. ................ 473/484 |
| 6,623,223 B1 | | 9/2003 | Wrobley et al. |
| 6,669,213 B2 | | 12/2003 | Woerner |
| 6,978,906 B2 | | 12/2005 | Wishart et al. |
| 2003/0155730 A1 | | 8/2003 | Chu et al. |
| 2004/0150177 A1 | | 8/2004 | Thiede et al. |
| 2005/0206106 A1 | | 9/2005 | Labadie et al. |
| 2006/0022426 A1 | | 2/2006 | Clive-Smith |
| 2007/0145215 A1 | * | 6/2007 | Riblet ..................... 248/226.11 |

* cited by examiner

*Primary Examiner* — Terrell McKinnon
*Assistant Examiner* — Chiedu Chibogu
(74) *Attorney, Agent, or Firm* — Standley Law Group LLP

(57) ABSTRACT

A latching mechanism capable of providing clamped retention to a vertical member, and a repositionable part support device and part support assembly employing said latching mechanism. The latching mechanism includes an enclosure having an open interior for receiving a vertical member and a pivotal handle that can be used to move a clamping roller out of contact with the vertical member during repositioning. A spring may be provided for otherwise biasing the clamping roller toward the vertical member. A support pin is located within the interior of the enclosure to engage a pin-receiving hole in the vertical member. The repositionable part support device and part support assembly may have a part support member that is affixed to and extends from said latching mechanism enclosure.

17 Claims, 8 Drawing Sheets

FIG-9

LATCHING MECHANISM AND REPOSITIONABLE PART SUPPORT DEVICE EMPLOYING SAID LATCHING MECHANISM

CROSS-REFERENCE TO RELATED APPLICATIONS

This application is a divisional of U.S. patent application Ser. No. 11/859,693, filed Sep. 21, 2007, which is hereby incorporated by reference.

BACKGROUND OF THE INVENTIVE FIELD

The present invention is directed to a rack for temporarily storing and transporting parts, such as automotive body panels. More particularly, the present invention is directed to such a rack that is adjustable for use with parts of varying size and or shape.

Part storage racks of various types and designs would be well known to those skilled in the art. Such racks may include individual shelves or compartments on/within which parts are stored. Other similar racks may include various styles of parts hangers that permit parts to be suspended within the confines of the rack frame. These racks are generally employed to store parts on a temporary basis, such as until they are needed in an associated manufacturing process.

Certain embodiments of such racks may be stationary in nature. Other embodiments may be mobile, which typically allows for the towing thereof to a desired location via a tow motor or some other powered means. In this latter embodiment, a rack may be loaded with a number of parts at a first location, such as at or near the point of manufacture, and subsequently transported to another location associated with their ultimate use.

At least with respect to a manufacturing environment, it can be easily understood that a multitude of different parts may need to be stored and/or transported in this manner. Due to the often dissimilar nature of the size and/or shape of such parts, however, a number of specialized racks are generally required for this purpose.

While such a scenario may be typical to many manufacturing (and non-manufacturing) environments, it is particularly common in the vehicle manufacturing industry. Consequently, while it is to be understood that the present invention is in no way limited to such use, for purposes of simplicity, a vehicle manufacturing setting will be used hereafter with respect to describing the present invention.

Obviously, the manufacturing of a vehicle requires a multitude of different individual components. While some of these components may be similar in size and/or shape, most are not. Even related components may be sufficiently dissimilar as to require separate, dedicated parts storage racks. For example, the various panels that make up a common vehicle body can be quite dissimilar in size and/or shape—often necessitating the use of dedicated parts racks for each one thereof.

This situation can be further complicated when a single facility manufactures more than one model of vehicle, in which case multiple dedicated racks may, for example, be required for even the same body panel (e.g., hood, fender, etc.) of different vehicle models. Consequently, it is evident that the requirement for different parts storage racks can quickly grow to a significant level.

This is problematic for several reasons. First, and perhaps most obvious, is the cost involved to manufacture such racks. That is, the more racks required, the greater the acquisition cost. Further, in addition to the initial manufacturing cost, dedicated parts racks typically must be modified each time there is a sufficiently significant change to the parts that such racks are designed to store. With respect to vehicle manufacturing, this situation almost certainly occurs at each new model introduction, but may also occur more frequently, such as at the time of the intermediate redesigns that most vehicle manufacturers now undertake. In some cases, a redesigned part may be sufficiently different in size and/or shape so as to require an entirely new rack; or at least a substantially new portion thereof.

In addition to the costs associated with part rack acquisition or modification, such racks can also occupy significant floor space in a factory or other setting. Consequently, a greater number of racks will require a greater amount of floor space—whether the racks are in use or not. Still further, the use of multiple racks requires familiarity therewith by workers to ensure that the proper rack is used with a particular part. The use of a greater number of racks may also lead to inefficiency, as workers will likely be required to spend more time sorting through, moving and staging the racks in order to ensure that the proper rack is available when needed.

Therefore, it can be understood that a parts storage rack that can be easily adjusted to accommodate a variety of different parts would be highly desirable for a number of reasons. A parts storage rack of the present invention provides such sought after adjustability.

SUMMARY OF THE GENERAL INVENTIVE CONCEPT

An adjustable parts storage rack of the present invention provides for at least 2-dimensional adjustment of part storage position. Further, a number of relocatable and/or interchangeable part supports can be associated with the rack to maximize the flexibility thereof.

One exemplary parts storage rack of the present invention includes a substantially rectangular frame comprising a substantially horizontally-oriented base or floor, a number of corner posts extending vertically upward from the base, and a number of horizontally-oriented frame members extending between the corner posts so as to form a framework having a rear and two opposed sides of substantially open nature. In this particular embodiment, the front of the rack is completely open in order to maximize accessibility—although such is not required. This rack is substantially rectangular in overall shape, although other shapes are also possible.

A number of vertical support members may be arranged between two spaced apart and horizontally-oriented lateral positioning members along the rear side of the rack. The vertical support members may be moved along the length of the horizontally-oriented lateral positioning members, but vertical movement of the vertical support members is generally constrained thereby.

Preferably, each vertical support member includes a plurality of holes or other features that extend along some length thereof. These features are provided for assistance with the releasable retention of one or more part support elements to the vertical support structures. For example, in one embodiment, each vertical support member may have one or more part support arms releasably affixed thereto by a novel latching mechanism. The part support arms may extend forward from the vertical support members toward the front of the rack. Such part support arms may be used, for example, to hang certain vehicle body panels through an aperture therein.

The part support structures employed may thus be moved vertically along the length of the vertical support members, and temporarily secured at a desired position. Additionally, at least some of the vertical support members may also be moved along the horizontally-oriented lateral positioning members to which they are attached. Still further, the part support structures employed may be designed to position associated parts along yet a third dimension within the storage rack. As such, a wide variety of two-dimensionally or three-dimensionally selectable part support positions may be achieved, which can allow a storage rack of the present invention to be used with a number of different parts.

Preferably, but not necessarily, a storage rack of the present invention also includes wheels or some other element(s) that permits the rack to be moved between locations. In this manner, a storage rack of the present invention can be loaded in one location and moved to another location for unloading. A storage rack of the present invention may be adapted to be pulled, pushed, and/or lifted by any appropriate machinery (e.g., tow motor, tugger, forklift, etc.) known to those of skill in the art. A storage rack of the present invention may also be adapted so as to be stackable with other racks, whether such racks or of like or different design. A storage rack of the present invention may also have many other features, at least some of which are described in more detail with respect to the exemplary embodiment discussed below.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 8b is a left side view of the repositionable part support arm of FIG. 8a;

FIG. 8c is a bottom view of the repositionable part support arm of FIG. 8a;

FIG. 8d is a rear section view of the repositionable part support arm of FIG. 8a.

DETAILED DESCRIPTION OF EXEMPLARY EMBODIMENT(S)

One exemplary embodiment of an adjustable parts storage rack 5 ("parts storage rack" or "storage rack") of the present invention is depicted in FIGS. 1-4. As shown, this particular embodiment of the storage rack 5 is comprised of a substantially open framework. Preferably, the framework is constructed of a number of tubular members, although other materials may be substituted. The tubular members may be of square, rectangular, circular or other cross-sectional shape. In other embodiments, the open frameworks of this storage rack 5 may be replaced with substantially solid walls.

More particularly, the storage rack 5 includes a substantially horizontally-oriented base 10 having a number of interconnected and welded base frame members 15. In this particular embodiment, the base frame members 15 are constructed from square steel tubing, although one skilled in the art would clearly realize that the use of other materials is also possible. Wheels W are preferably, but not necessarily, affixed to the base 10 to facilitate transport of the storage rack 5. One or more sets of fork tubes 215 may also be affixed to the base to facilitate lifting and transport of the storage rack 5 by a fork lift.

Figure 3:
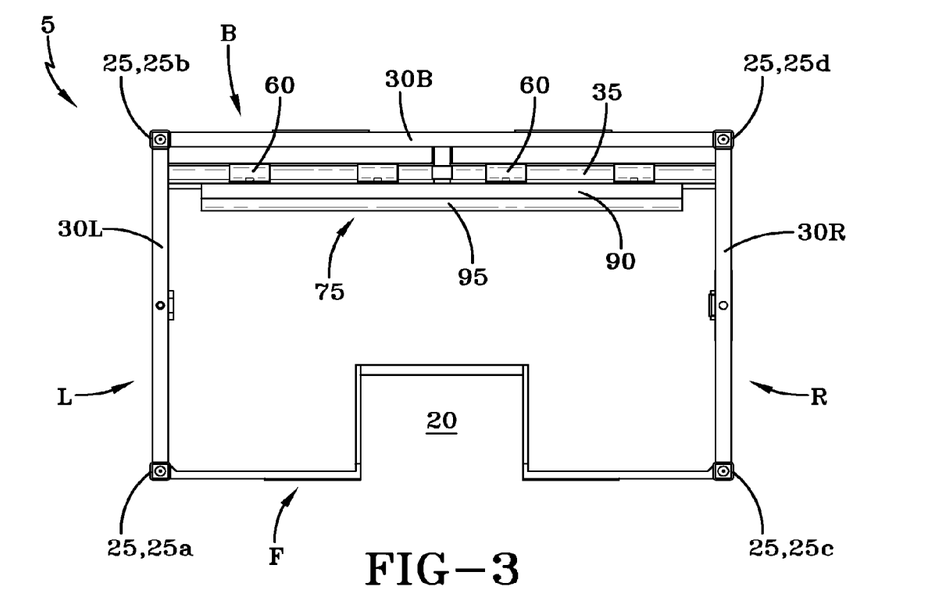
FIG. 3 is a top plan view of the adjustable parts storage rack of FIG. 1.
Figure 4:
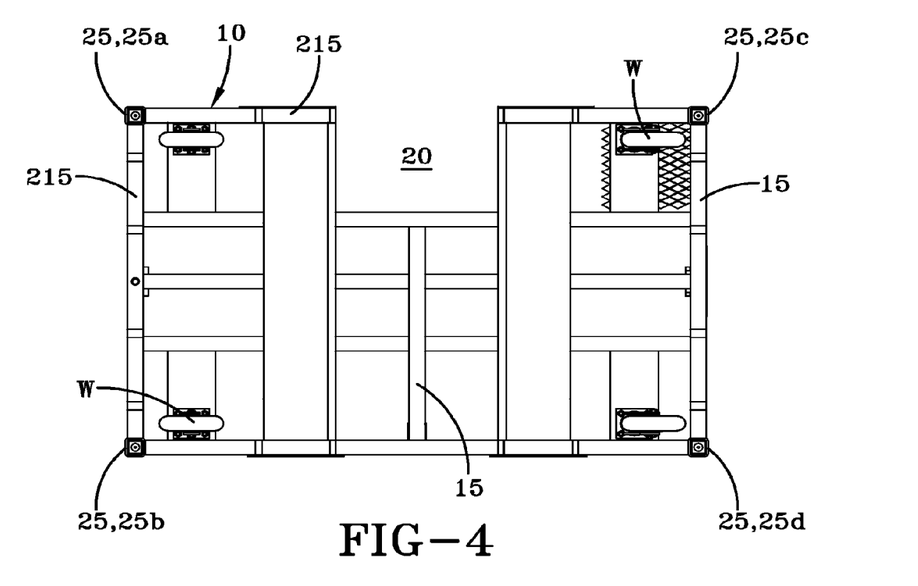
FIG. 4 is bottom plan view of the adjustable parts storage rack of FIG. 1.

This particular base, and the resulting storage rack 5, is substantially rectangular in shape. The base and storage rack may be of other shapes in other embodiments of the present invention. The base 10 is shown to have an optional recess 20 along a front side F thereof for facilitating access to the interior space of the storage rack 5 when loading or unloading parts. The top of the base 10 may be covered with various materials if desired, such as, without limitation, steel or aluminum decking, or expanded metal (a portion of which is shown in FIG. 3). Other embodiments of a storage rack of the present invention may forego a base covering material.

A corner post 25 extends vertically upward from each corner of the base 10. In this particular embodiment, the corner posts 25 are constructed from square steel tubing like base frame members 15. Again, one skilled in the art would clearly realize that the use of other corner post materials is also possible. The corner posts 25 may be welded to the base 10, but attachment by various fasteners and other techniques can also be employed.

As shown in FIGS. 1-4, one or more horizontally-oriented frame members 30L preferably extend between the left side corner posts 25a, 25b of the storage rack 5. Similarly, one or more horizontally-oriented frame members 30R preferably extend between the right side corner posts 25c, 25d of the storage rack 5. The corner posts 25a, 25b, 25c, 25d and the one or more horizontally-oriented frame members 30L, 30R collectively form a substantially open left side L and right side R, respectively, of the storage rack 5.

One or more one horizontally-oriented frame members 30B preferably also extend between the rear corner posts 25b, 25d. The rear corner posts 25a, 25d and the one or more horizontally-oriented frame members 30B collectively form a substantially open rear side B of the storage rack 5.

One or more vertical support members 50 may be arranged along or near the rear side B of the storage rack 5. For example, one or more vertical support members 50 may be associated with one or more horizontally-oriented frame members 30B that form a portion of the rear side of the storage rack 5. Alternatively, vertical support members 50 may be associated with one or more other members that are connected to the horizontally-oriented frame member(s) 30B.

In this particular embodiment of the storage rack 5, however, a number of vertical support members 50 are arranged between upper and lower lateral positioning members 35, 40 that are located slightly forward of the rear horizontally-oriented frame members 30B. More particularly, an upper lateral positioning member 35 extends between a left side horizontally-oriented frame member 30L and a right side horizontally-oriented frame member 30R. This particular embodiment of the upper lateral positioning member 35 is constructed from steel tubing or steel bar stock of circular cross-section, so as to mate with a corresponding engaging element as described in more detail below. Other materials and other cross-sections may be employed in other embodiments.

A lower lateral positioning member 40 is mounted to the corner posts 25b and 25d by a pair of extension members 45. This particular embodiment of the lower lateral positioning member 40 is constructed from square steel tubing, so as to mate with a corresponding engaging element as described in more detail below. Other materials and other cross-sections may also be used in alternative embodiments.

Figure 5A:
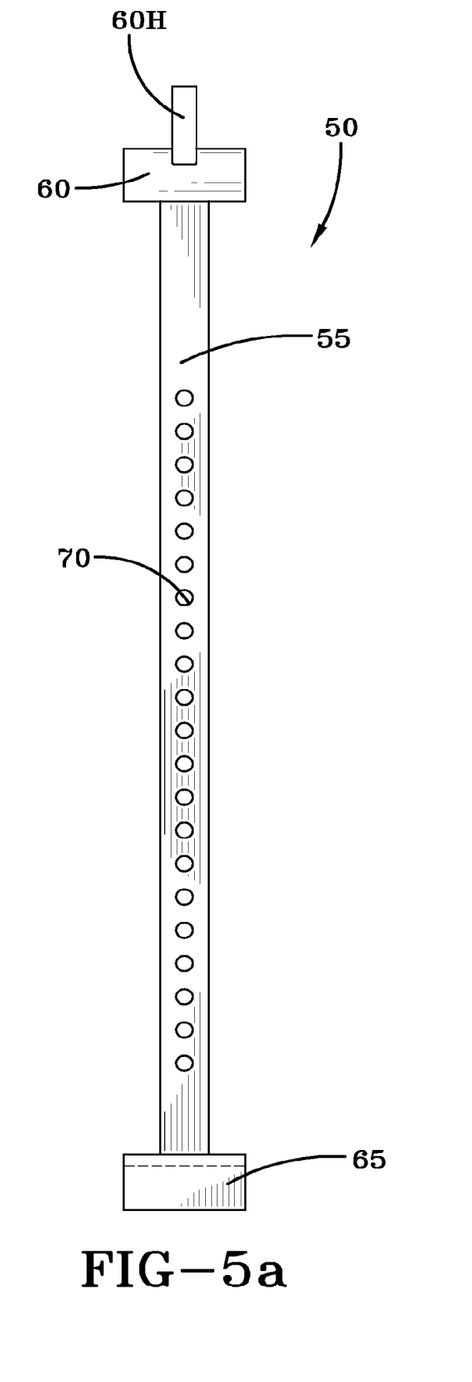
FIGS. 5a and 5b are enlarged front elevation and right side elevation views, respectively, of a vertical support member of the parts storage rack of FIG. 1.
Figure 5B:
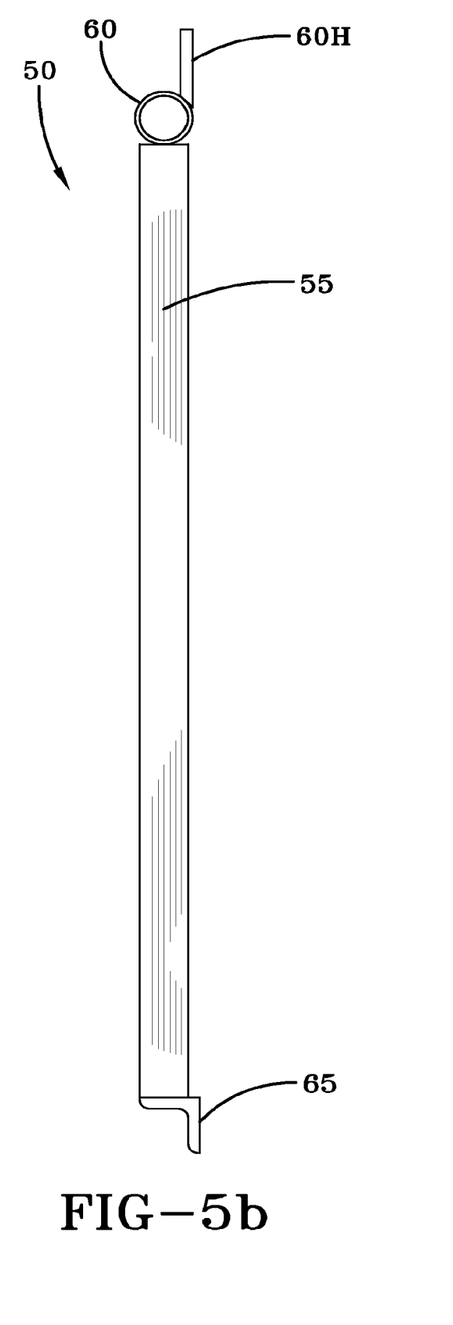

An enlarged view of one exemplary embodiment of a vertical support member 50 of the present invention can be observed in FIGS. 5A and 5B. As shown, the vertical support member 50 includes an elongated support portion 55 coupled at each end to a lateral positioning member engaging element 60, 65. While it should be understood that the elongated support portion 55 may be constructed from a variety of materials, the elongated support portion of this particular vertical support member 50 is comprised of square steel tubing. Other materials and other cross-sections may be employed in other embodiments.

An upper lateral positioning member engaging element (upper engaging element) 60 is attached to the elongated support portion 55 at an upper end thereof. As shown, the upper engaging element 60 is constructed from a section of horizontally-oriented hollow tubing having a circular cross-section. Preferably, but not necessarily, the upper engaging element 60 is provided with a handle 60H to assist with relocation of the vertical support member 50.

A lower lateral positioning member engaging element (lower engaging element) 65 is attached to the elongated support portion at a lower and thereof. As shown, the lower engaging element 65 is constructed from a section of horizontally-oriented angle material.

Figure 1:
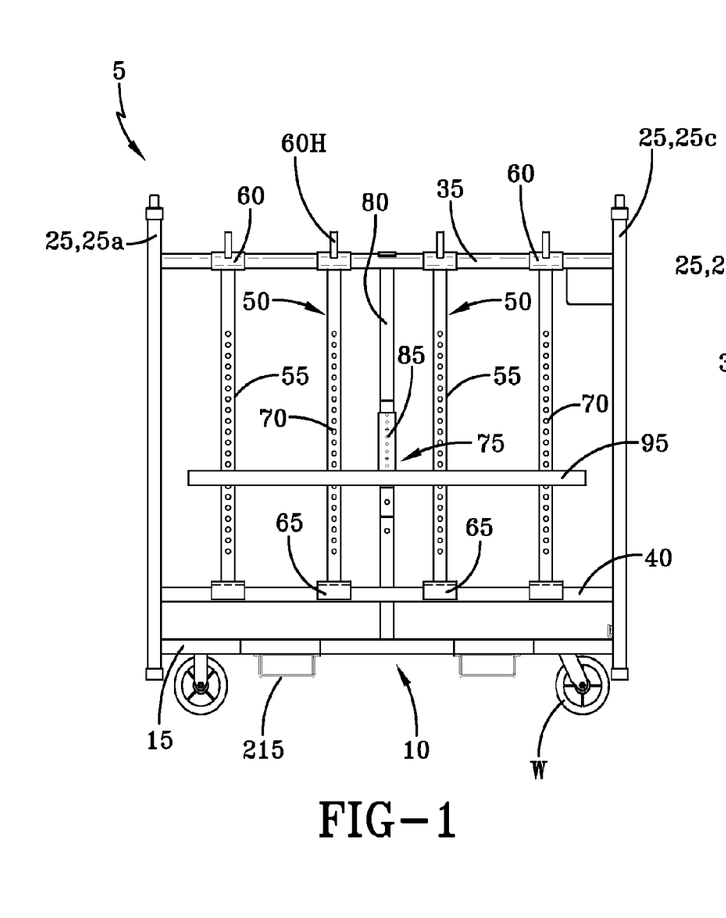
FIG. 1 is a front elevation view of an adjustable parts storage rack of the present invention.
Figure 2:
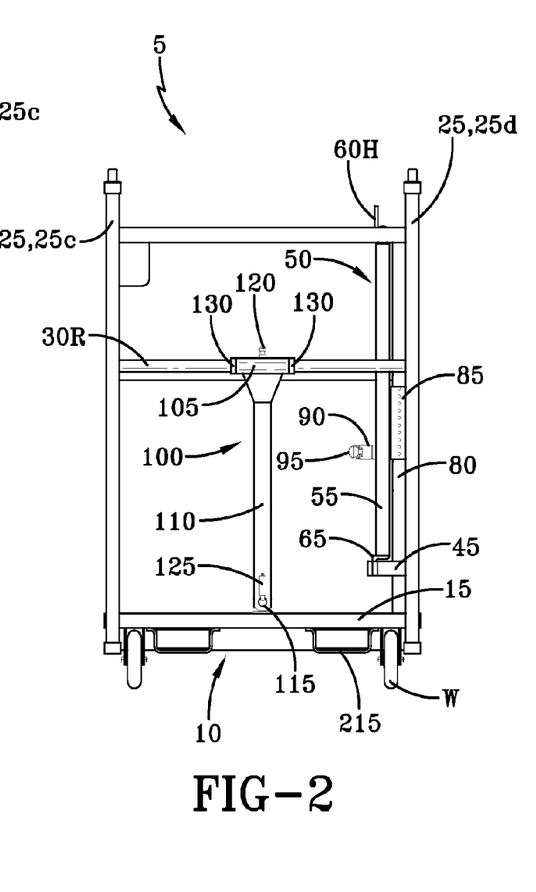
FIG. 2 is a right side elevation view of the adjustable parts storage rack of FIG. 1.

As can be best observed in FIGS. 1 and 3, when assembled to a storage rack 5 of the present invention, the upper lateral positioning member 35 passes through the upper engaging element 60. This allows the upper engaging element 60 to ride along and be guided by the upper lateral positioning member 35.

In this particular embodiment, the lower engaging element 65 is also free to move along the length of the lower lateral positioning member 40. As shown, the substantially L-shaped lower engaging element 65 mimics the shape of the underlying lower lateral positioning member 40. This allows the lower lateral positioning member 40 to provide guidance and support to the lower portion of the vertical members 50. Further, the lower lateral positioning member 40 helps to support the vertical members 50 when parts are suspended or otherwise associated therewith.

While the maximum limits of travel of the vertical support members 50 are constrained by the frame members between which the upper and lower lateral positioning members 35, 40 are attached, the selected position of each vertical support member 50 relative to the upper and lower lateral positioning members 35, 40 may be maintained in various ways. For example, after loading of parts to the storage rack 5, contact between adjacent parts may serve to prevent or minimize movement of the vertical support members 50. In alternative embodiments, various types of restraining means may be associated with the upper and/or lower engaging elements 60, 65 for this purpose. For example, a threaded member may pass through one or both of the engaging elements 60, 65 to make contact with the upper and/or lower lateral positioning members 35, 40, respectively. Alternatively, a pin may be located on one or both of the engaging elements 60, 65 to engage corresponding locating holes provided along the length of the upper and/or lower lateral positioning members 35, 40, respectively. A number of other known retention mechanisms may also be employed for this purpose, such as various types of clamps or latches.

A preferred technique for repositioning a vertical support member 50 of this particular storage rack 5 involves pivoting the vertical support member about the upper lateral positioning member 35 prior to movement thereof. In this manner, the lower engaging element 65 can be displaced from the lower lateral positioning member 40, thereby avoiding sliding contact therewith as the vertical member 50 is repositioned. In this and other embodiments of a storage rack of the present invention, a vertical support member can also be repositioned by simply sliding the vertical support member along the upper and lower lateral positioning members.

In this latter regard, either or both of the upper and lower engaging elements 60, 65 may optionally utilize one or more low friction materials to facilitate sliding along the upper and lower lateral positioning members 35, 40, respectively. For example, liners or pads of a material such as nylon may be placed between the engaging elements 60, 65 and the lateral positioning members 35, 40. In alternative embodiments, it may be possible to construct the upper and/or lower engaging elements directly from such materials. In yet other embodiments, bearings or bushings may be employed for this purpose.

Although certain exemplary engaging element constructions have been shown and described in detail herein, it would be understood by one skilled in the art in a variety of other constructions are also possible. As such, virtually any arrangement that allows for the guided and/or constrained movement of the vertical support members along the lateral positioning members may be employed by the present invention.

A number of locating holes 70 are shown to be present along the length of the elongated support portion 55 of the vertical support member 50. The locating holes 70 are provided to assist with the releasable attachment of one or more part support structures, such as the part support arm 135 shown in FIGS. 8a-8d, and described in more detail below. In other embodiments of the present invention, vertical support members may be provided with other retention assisting features. For example, and without limitation, the holes 70 may be replaced with convex features such as pins, tabs, or other protrusions, or convex features such as cavities or grooves. Virtually any other feature capable of assisting in the releasable retention of a part support structure may also be employed by the present invention.

As can be best observed in FIG. 5A, the holes 70 present in the vertical support member 50 are intervally arranged along the length thereof. The holes 70 are shown to be arranged with equal spacing therebetween, however, dissimilar spacing may also be employed. The use of a multitude of holes 70 allows a part support structure to be releasably engaged with a vertical support member 50 at each hole location, thereby maximizing the ability of the associated storage rack 5 to handle different parts. When holes 70 or other support structures are utilized, they may be numbered or otherwise labeled as shown in FIG. 5a. Such labeling can help to facilitate the proper repositioning of one or more part support structures (e.g., arms) with respect to a particular part of interest.

A storage rack of the present invention may employ an optional part bumper assembly that prevents possible damaging contact between parts stored in the rack and the vertical support members or portions thereof. One embodiment of such a part bumper assembly 75 can be observed in FIGS. 1-3 and 6a-6c.

As shown, this particular part bumper assembly 75 is adapted for relocatable attachment to a vertical bumper assembly support member 80 that resides at or near the rear side of the storage rack 5. With respect to this embodiment of the storage rack 5, the vertical bumper assembly support member 80 extends between the upper lateral positioning member 35 and the base 10.

Figure 6A:
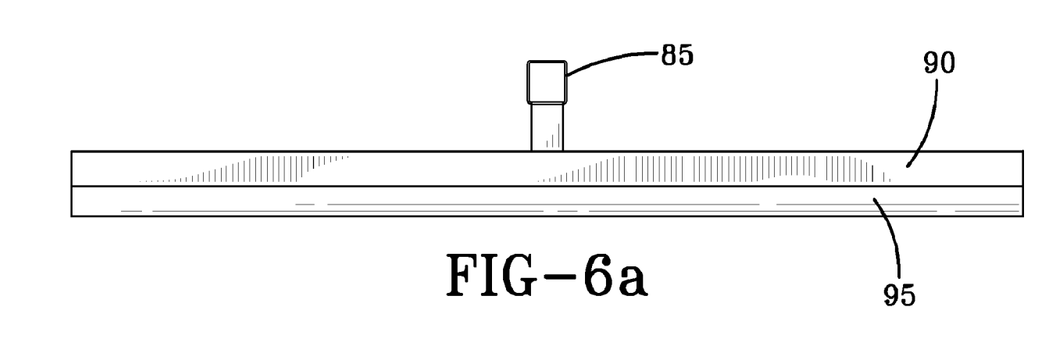
FIGS. 6a, 6b and 6c are enlarged top plan, front elevation and right side elevation views, respectively, of a bumper assembly of the parts storage rack of FIG. 1.
Figure 6B:
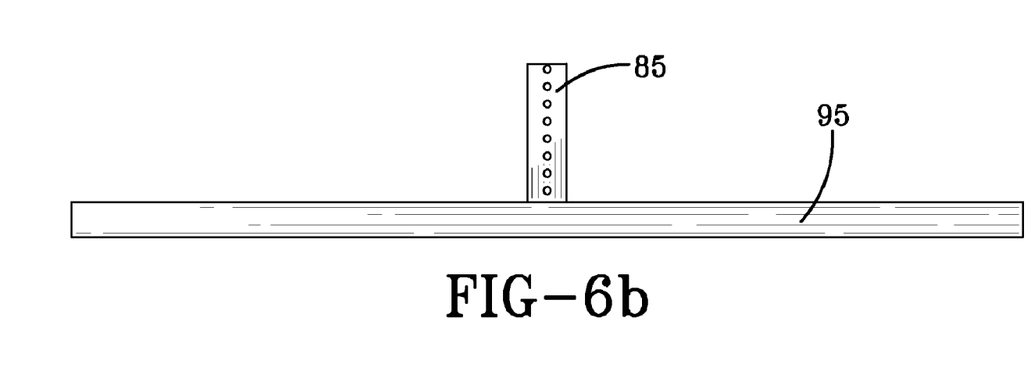
Figure 6C:
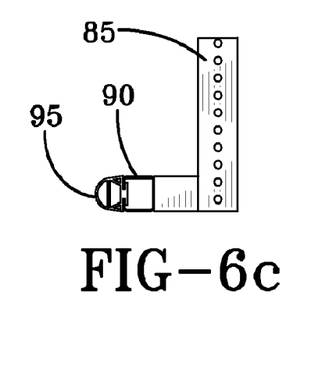

As can be best observed in FIGS. 6a-6c, the part bumper assembly 75 includes a vertically-oriented mounting member 85 that is designed to fit over and slide along the exterior of the vertical bumper assembly support member 80. Preferably, the mounting member 85 and the support member 80 are adapted to allow for releasable engagement of the mounting member with the support member at various points along the length thereof. This may be accomplished through the use of a spring-loaded pin and mating holes and/or any of other various techniques that would be known to one skilled in the art.

A bumper receiver 90 is connected to the mounting member 85. The bumper receiver 90 is preferably of sufficient length and is oriented in such a manner as to pass in front of the vertical support members 50. As shown in FIG. 1, a bumper receiver 90 is substantially perpendicular to the vertical support members 50. Other orientations are also possible. A bumper 95 of a material that will not damage parts upon contact therewith is retained by or otherwise connected to the bumper receiver 90. The bumper 95 may be comprised of rubber, foam, or any of other various materials that would be obvious to one skilled in the art.

In other embodiments of the present invention, a bumper assembly may be associated with a vertical support member or some other portion of the storage rack. Obviously, a variety of other bumper designs that minimize or prohibit contact between parts and the frame members of the storage rack can be employed, and all such designs are considered to be within the scope of the present invention.

Figure 7A:
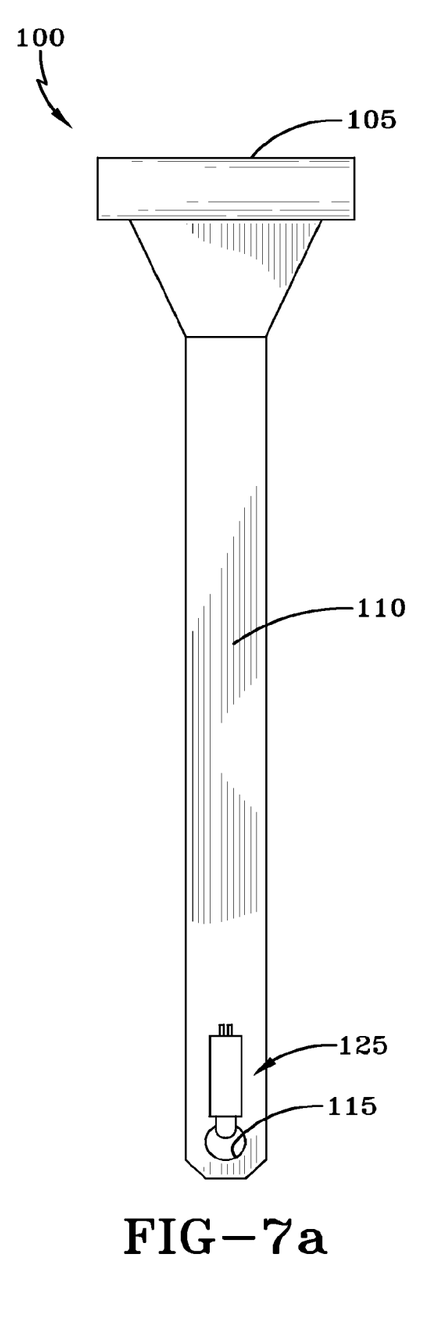
FIGS. 7a and 7b are enlarged front elevation and right side elevation views, respectively, of an adjustable towing tongue of the parts storage rack of FIG. 1.
Figure 7B:
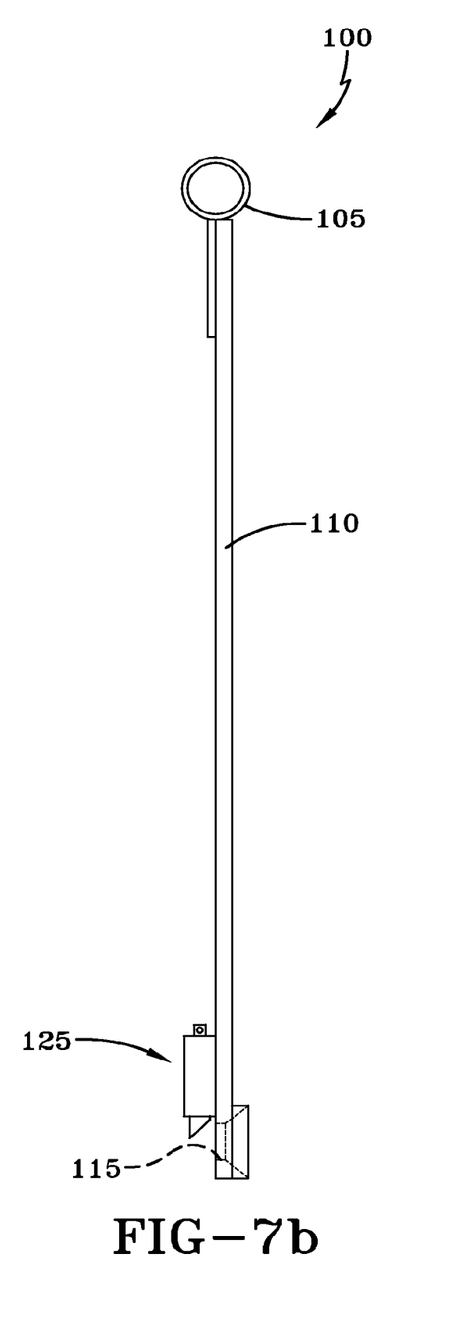
Figure 8A:
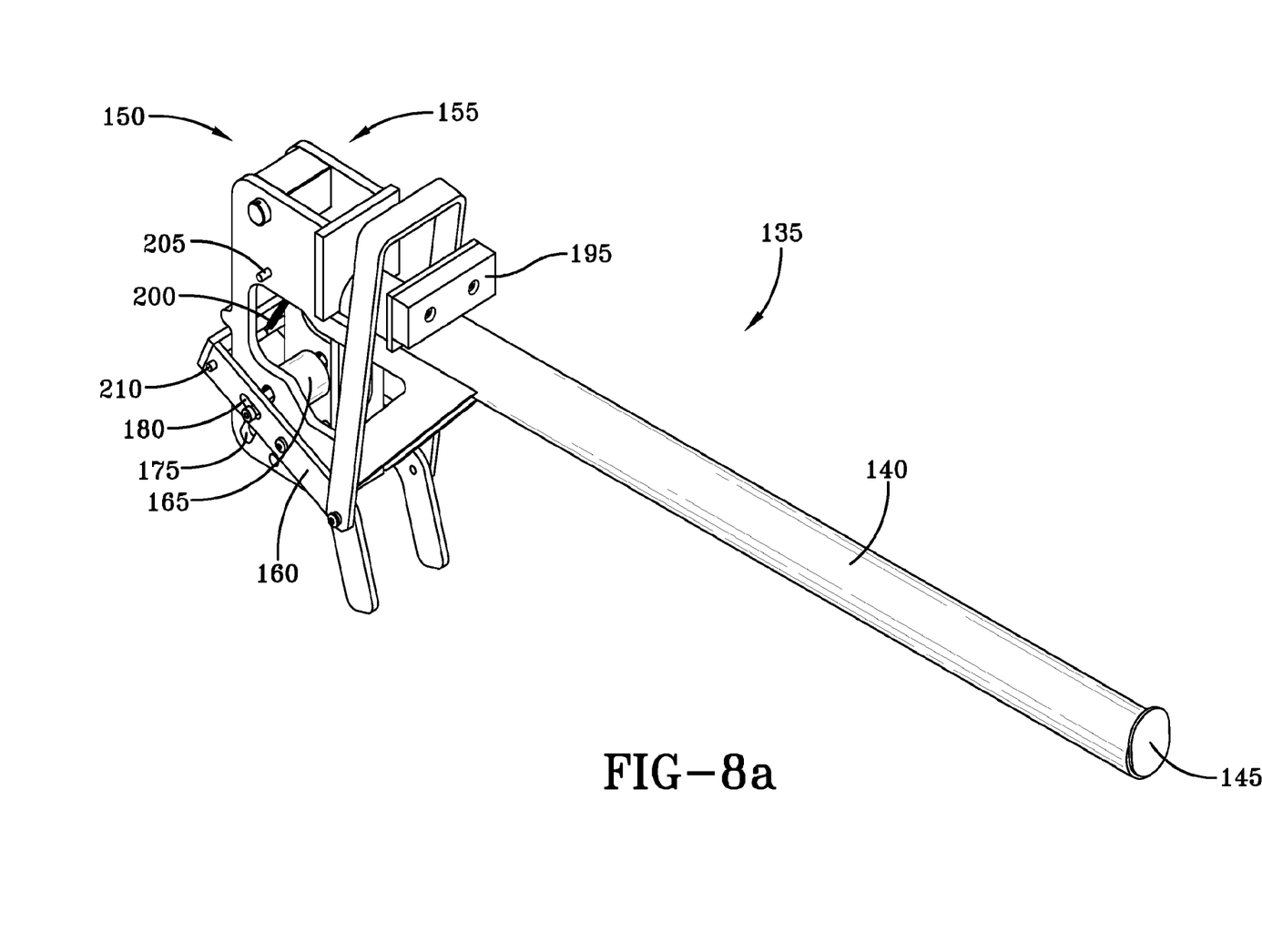
FIG. 8a is a perspective view of an exemplary embodiment of a repositionable part support arm of the present invention.
Figure 8B:
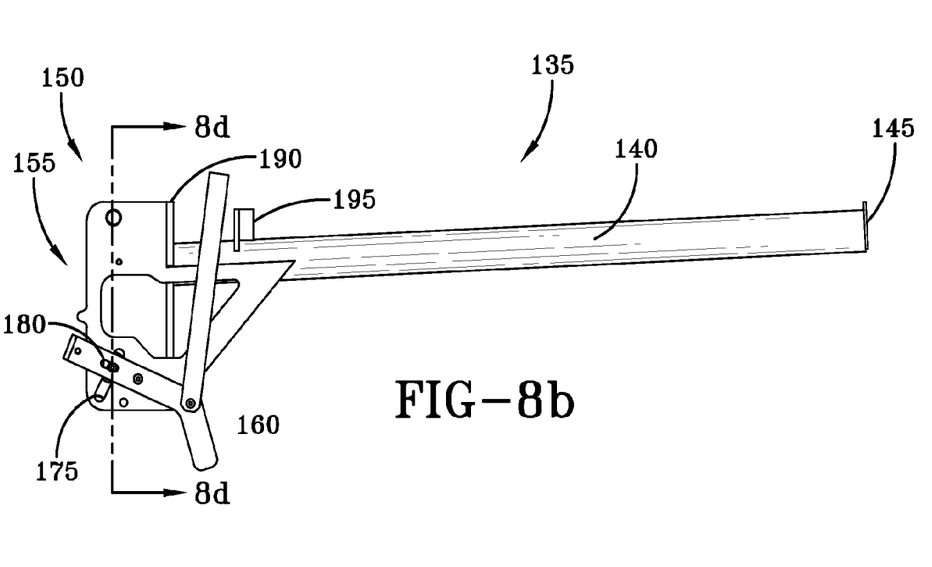
Figure 8C:
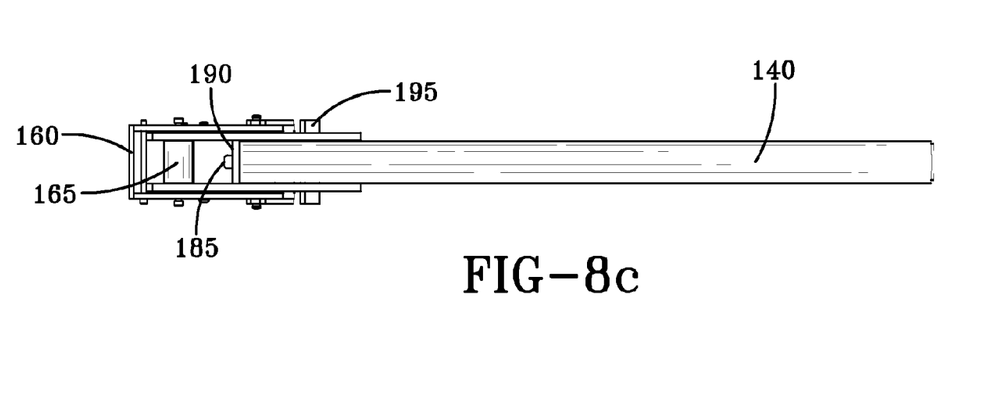
Figure 8D:
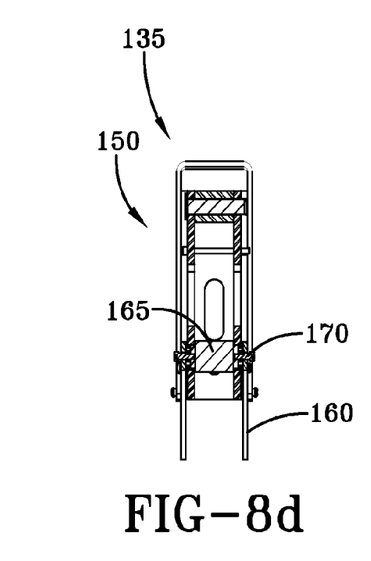

The storage rack 5 is also shown to be equipped with an optional pivoting trailering tongue assembly 100 that is connected at one end to the right side horizontally-oriented frame member 30R. As can be best observed in FIGS. 7a-7b, the trailering tongue assembly 100 includes a pivoting mounting element 105 that is comprised of a section of hollow tubing of circular cross-section. The mounting element 105 is designed to fit over and pivot around the right side horizontally-oriented frame member 30R—which, at least in this embodiment, is also of circular cross-section. The lateral position of the trailering tongue 100 on the right side horizontally-oriented frame member 30R may be maintained via the use of a pair of locking collars 130 or by other similar elements that would be known to one skilled in the art.

A proximal end of an elongate tongue portion 110 is connected to the mounting element 105. A receiving hole 115 is provided at the distal end of the elongate tongue portion 110 to receive the hitch pin of another storage rack. An exemplary hitch pin 120 can be seen extending upward from a left side horizontally-oriented frame member in FIG. 2. A latch mechanism 125 or a similar device may be provided at the distal end of the tongue portion 115 to releasably secure the trailering tongue 100 to the hitch pin of another rack.

By pivoting the trailering tongue assembly 100 into a substantially horizontal position and engaging the receiving hole 115 with the hitch pin 120 of an adjacent rack, it can be understood that a number of storage racks can be connected in series for transport to a desired location. When not in use, the trailering tongue assembly 100 may reside in a stored position such as that observable in FIG. 2. A catch or some other suitable mechanism may be located on the base 10 or some other portion of the storage rack 5 to prevent unintended swinging of the trailering tongue assembly 100 while the rack is in motion.

One exemplary embodiment of a repositionable part support arm 135 of the present invention is depicted in FIGS. 8a-8d. The part support arm 135 includes an elongate part support member 140 that is coupled to and extends forward from a latching mechanism 150. In this particular embodiment, the part support member 140 is constructed of hollow steel tubing of circular cross-section, although it should be obvious that other materials and cross-sections may be employed. Preferably, but not necessarily, the part support member 140 is connected to the latching mechanism 150 such that the part support member resides at a slight upward angle when the part support arm 135 is engaged with a vertical support member 50 of the storage rack 5 (see FIG. 9). A forward stop 145 or similar element may be located at the distal end of the part support member 140 to further prevent parts from slipping off the end thereof. A rear stop 195 may be provided to prevent parts from interfering with the latch mechanism 150.

As can be understood from a review of FIGS. 8a-8d and FIG. 9, this particular latching mechanism 150 is designed to fit over and clamp to the elongated support section 55 of the vertical support members 50 of the storage rack 5. To that end, the latching mechanism 150 includes a box-like enclosure 155 that substantially surrounds the elongated support portion 55 of the vertical support member 50 when the latching mechanism is positioned thereon.

A handle assembly 160 wraps partially around and is pivotally connected to opposite sides of the enclosure 155. A clamping roller 165 is located within a hollow space near the rear of the enclosure interior. The clamping roller 165 includes a shaft 170 that extends through a pair of angled slots 175 that pass through opposite sides of the enclosure 155. The ends of the clamping roller shaft 170 also extend into receiving slots 180 in the handle assembly 160 that at least partially overlie the slots 175 in the enclosure.

A support pin 185 extends inward/rearward into the enclosure interior from a forward plate 190 thereof. The support pin 185 is designed to engage the holes 70 in a vertical support member 50 of the storage rack 5.

Pivoting the handle assembly in an upward direction 160 results in a forward movement of the clamping roller 165. The handle assembly 160 is preferably biased in an upward direction by one or more springs 200 that are connected between upper and lower bolts or pins 205, 210 associated with the enclosure 155. The spring(s) 200 thus maintain the latching mechanism in a clamped (secure) position when left unattended.

Figure 9:
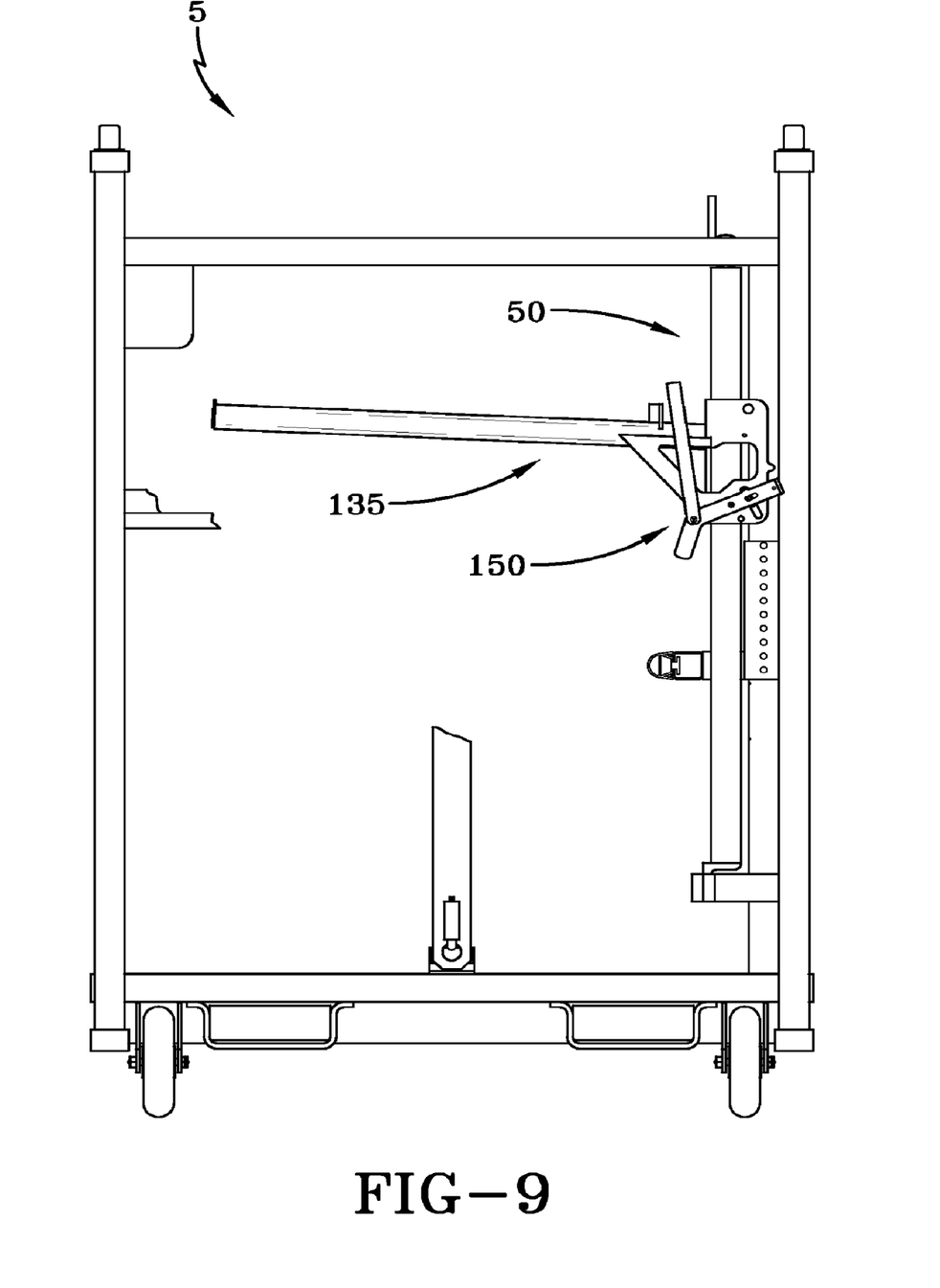
FIG. 9 shows the repositionable part support arm of FIG. 8a releasably attached to a vertical support member of the parts storage rack of FIG. 1.

As shown in FIG. 9, when in use, the enclosure 155 will have been positioned over an associated vertical support member 50 of the storage rack 5. When repositioning of the part support arm 135 is desired, the handle assembly 160 of the latching mechanism 150 is pivoted by a user so as to overcome the spring force and cause a rearward movement of the clamping roller 165. This allows the support pin 185 to be withdrawn from an associated hole 70 in the vertical support member 50. The part support arm 135 is then moved to the desired position along the length of an associated vertical support member 50.

Once the desired location has been reached, the enclosure 155 is maneuvered such that the support pin 185 enters the local hole 70. The handle assembly 160 is then released, whereafter the clamp roller 165 is moved forward into engagement with the elongated support portion 55 of the vertical support member 50 by the spring(s) 200. This biased contact between the clamping roller 165 and the vertical support member 50 helps to ensure that the part support arm 135 will not become inadvertently dislodged during movement of the storage rack 5. Furthermore, should a part support arm 135 somehow become inadvertently dislodged from its position on a vertical support member 50, the latching mechanism 150 ensures that the part support arm will not drop along the vertical support member beyond a position defined by the next lowest hole 70.

In this embodiment, parts are then stored in the rack by resting or hanging the parts on the part support arm(s) 135. For example, a row of part support arms could be assembled to store a number of elongate parts that simply rest on the top surface of the arms. In another embodiment, parts such as vehicle body panels are suspended from the part support arm(s) 135 through an aperture present therein.

As can be seen from the foregoing description and reference to FIG. 9, multiple part support structures (e.g., part support arms 135) can be secured to each vertical support member 50 if desired. Other types of part support structures may also be employed, such as for example, bins, shelves, hooks, or other structures as determined by the type of parts to be stored by the storage rack. It should also be realized that the number of vertical support members present, the number of vertical support members used, and the lateral positioning of the vertical support members may all be varied. Further, the total number of part support structures (e.g., parts support arms) used, the number of vertical support members to which part support structures are attached, the number of part support structures attached to a given vertical support member, and the vertical positioning of each part support structure along the length of a vertical support member can also all be varied. Thus, it can be understood that a storage rack of the present invention, such as the storage rack 5, can provide for a virtually limitless number of horizontal and vertical part support locations.

One exemplary embodiment of a parts storage rack of the present invention has been provided herein. While certain constructions and features thereof have been described in detail for the purpose of illustration, it is to be understood that a storage rack of the present invention may have a myriad of other designs and constructions. Therefore, while a certain embodiment(s) of the present invention has been described in detail above, the scope of the invention is not to be considered limited by such disclosure, and modifications are possible without departing from the spirit of the invention as evidenced by the following claims:

What is claimed is:

1. A latching mechanism for providing clamped retention to a vertical member, comprising:
   an enclosure having four sides framing a substantially open interior;
   a handle partially surrounding said enclosure and pivotally attached to said enclosure at opposite sides thereof;
   a pair of angled grooves passing through opposite sides of said enclosure so as to at least partially underlie grooves passing through overlying portions of said handle;
   a clamping roller located near a rearward portion of said interior of said enclosure and having a shaft with ends extending through said grooves in said enclosure and said handle;
   a support pin located within said interior of said enclosure and extending toward said clamping roller from an opposite side of said enclosure; and
   at least one spring for biasing said clamping roller toward said support pin;
   wherein said vertical member includes at least one hole for receiving said support pin; and
   wherein after location of said enclosure over said vertical member and insertion of said support pin into said at least one hole, a forward biasing of said clamping roller toward said support pin by said at least one spring causes said clamping roller to exert a clamping force against said vertical member that resists withdrawal of said support pin from said hole.

2. The latching mechanism of claim 1, wherein said at least one spring extends between an upper pin associated with said enclosure and a lower pin associated with said handle.

3. The latching mechanism of claim 2, wherein forced pivoting of said handle by a user overcomes the force exerted by said at least one spring and causes a rearward movement of the clamping roller.

4. The latching mechanism of claim 1, further comprising an elongate part support member coupled to and extending forward from one side of said latching mechanism enclosure.

5. The latching mechanism of claim 4, wherein the part support member is affixed to said enclosure so as to reside at a slight upward angle when the latching mechanism is engaged with a vertical member.

6. A repositionable part support device, said device adapted to provide clamped retention to a vertical member, comprising:
   an enclosure having four sides framing a substantially open interior for receiving a vertical member;
   an elongate part support member coupled to and extending forward from one side of said enclosure;
   a handle partially surrounding said enclosure and pivotally attached to said enclosure at opposite sides thereof;
   a pair of angled grooves passing through opposite sides of said enclosure so as to at least partially underlie grooves passing through overlying portions of said handle;
   a clamping roller located near a rearward portion of said interior of said enclosure and having a shaft with ends extending through said grooves in said enclosure and said handle;
   a support pin located within said interior of said enclosure and extending toward said clamping roller from an opposite side of said enclosure; and
   at least one spring for biasing said clamping roller toward said support pin;
   wherein said vertical member includes at least one hole for receiving said support pin; and
   wherein after location of said enclosure over said vertical member and insertion of said support pin into said at least one hole, a forward biasing of said clamping roller toward said support pin by said at least one spring causes said clamping roller to exert a clamping force against said vertical member that resists withdrawal of said support pin from said hole.

7. The part support device of claim 6, wherein said at least one spring extends between an upper pin associated with said enclosure and a lower pin associated with said handle.

8. The part support device of claim 7, wherein forced pivoting of said handle by a user overcomes the force exerted by said at least one spring and causes a rearward movement of the clamping roller.

9. The part support device of claim 6, wherein the part support member is affixed to said enclosure so as to reside at a slight upward angle when the latching mechanism is engaged with a vertical member.

10. The part support device of claim 6, further comprising a forward stop on said part support member.

11. The part support device of claim 6, further comprising a rearward stop on said part support member, said rearward stop for preventing a part supported by said part support member from interfering with operation of said latching mechanism.

12. A repositionable part support assembly, said assembly adapted to provide vertically repositionable support of a part, comprising:
   a vertical support member, said vertical support member including a plurality of pin-receiving holes disposed along a length thereof;
   a latching mechanism, said latching mechanism further comprising:
      an enclosure having four sides framing a substantially open interior through which said vertical support member passes,
      a handle partially surrounding said enclosure and pivotally attached to said enclosure at opposite sides thereof,
      a pair of angled grooves passing through opposite sides of said enclosure so as to at least partially underlie grooves passing through overlying portions of said handle,
      a clamping roller located near a rearward portion of said interior of said enclosure and having a shaft with ends extending through said grooves in said enclosure and said handle,
      a support pin located within said interior of said enclosure and extending toward said clamping roller from an opposite side of said enclosure, and
      at least one spring for biasing said clamping roller toward said support pin; and
   an elongate part support member coupled to and extending forward from one side of said enclosure of said latching mechanism;
   wherein after insertion of said support pin into one of said plurality of pin-receiving holes of said vertical support member, a forward biasing of said clamping roller toward said support pin by said at least one spring causes said clamping roller to exert a clamping force against said vertical support member that resists withdrawal of said support pin from said hole.

13. The repositionable part support assembly of claim 12, wherein said at least one spring of said latching mechanism extends between an upper pin associated with said enclosure and a lower pin associated with said handle.

14. The repositionable part support assembly of claim 13, wherein forced pivoting of said handle by a user overcomes the force exerted by said at least one spring and causes a rearward movement of the clamping roller.

15. The repositionable part support assembly of claim 12, wherein said part support member is affixed to said latching mechanism enclosure so as to reside at a slight upward angle when the latching mechanism is engaged with said vertical member.

16. The repositionable part support assembly of claim 12, further comprising a forward stop on said part support member.

17. The repositionable part support assembly of claim 12, further comprising a rearward stop on said part support member, said rearward stop for preventing a part supported by said part support member from interfering with operation of said latching mechanism.

* * * * *